(12) United States Patent
Habusha et al.

(10) Patent No.: US 10,768,965 B1
(45) Date of Patent: Sep. 8, 2020

(54) REDUCING COPY OPERATIONS FOR A VIRTUAL MACHINE MIGRATION

(71) Applicant: Amazon Technologies, Inc., Seattle, WA (US)

(72) Inventors: Adi Habusha, Moshav Alonei Abba (IL); Ali Ghassan Saidi, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/969,684

(22) Filed: May 2, 2018

(51) Int. Cl.
*G06F 12/02* (2006.01)
*G06F 9/455* (2018.01)
*G06F 12/1036* (2016.01)

(52) U.S. Cl.
CPC ...... *G06F 9/45558* (2013.01); *G06F 12/0292* (2013.01); *G06F 12/1036* (2013.01); *G06F 2009/4557* (2013.01); *G06F 2212/152* (2013.01); *G06F 2212/50* (2013.01)

(58) Field of Classification Search
CPC .................................................. G06F 12/0292
USPC ........................................................ 711/161
See application file for complete search history.

(56) References Cited

U.S. PATENT DOCUMENTS

| 6,112,285 | A | * | 8/2000 | Ganapathy .......... G06F 12/1027 711/203 |
| 7,814,287 | B2 | | 10/2010 | Pratt |
| 8,689,211 | B2 | | 4/2014 | Agbaria et al. |
| 9,201,612 | B1 | | 12/2015 | Vincent |
| 9,483,414 | B2 | | 11/2016 | Tsirkin et al. |
| 9,766,930 | B2 | | 9/2017 | Tarasuk-levin et al. |
| 9,965,311 | B2 | | 5/2018 | Tsirkin et al. |
| 10,216,598 | B2 | | 2/2019 | Haid et al. |
| 10,394,656 | B2 | | 8/2019 | Tarasuk-levin et al. |
| 10,404,674 | B1 | | 9/2019 | Bshara et al. |
| 2011/0167195 | A1 | * | 7/2011 | Scales ................ G06F 9/45558 711/6 |
| 2014/0281118 | A1 | * | 9/2014 | Hepkin .............. G06F 9/45533 711/6 |
| 2016/0132443 | A1 | * | 5/2016 | Davda .................... G06F 13/28 710/308 |
| 2017/0068304 | A1 | | 3/2017 | Lee et al. |
| 2017/0132028 | A1 | | 5/2017 | Tsirkin et al. |
| 2018/0060100 | A1 | * | 3/2018 | Tsirkin ............... G06F 9/45558 |
| 2018/0074908 | A1 | | 3/2018 | Tarasuk-levin et al. |

(Continued)

OTHER PUBLICATIONS

Saidi, et al. U.S. Appl. No. 15/969,650, filed May 2, 2018, titled Eliding Redundant Copying for Virtual Machine Migration.

(Continued)

*Primary Examiner* — Gautam Sain
(74) *Attorney, Agent, or Firm* — Kilpatrick Townsend & Stockton LLP

(57) ABSTRACT

Systems and methods are provided to reduce the number of redundant copy operations performed as part of a live migration of a virtual machine executing a guest. A hypervisor can queue the copy operations in a processing engine. While pre-copying for the live migration of the VM, the guest may continue to write to the pages. In one embodiment, the processing engine may clear a dirty page just before performing the copy operation of the modified page to a target device, thus extending the window of time to capture any future writes to that page.

20 Claims, 12 Drawing Sheets

(56) References Cited

U.S. PATENT DOCUMENTS

2019/0018746 A1* 1/2019 Haid .................. G06F 11/1438
2019/0065228 A1* 2/2019 Tsirkin ................ G06F 9/45558

OTHER PUBLICATIONS

Jo et al., "Optimizing Live Migration for Virtual Desktop Clouds", 2013 IEEE International Conference on Cloud Computing Technology and Science, vol. 1, Feb. 21, 2020, pp. 104-111.
Strunk, "Costs of Virtual Machine Live Migration: A Survey", 2012 IEEE Eighth World Congress on Services, Jun. 24-29, 2012, pp. 323-329.
Yiqiu et al., "Improvement on Live Migration of Virtual Machine by Limiting the Activity of CPU", 2017 International Conference on Computer Systems, Electronics and Control (ICCSEC), Dec. 2017, pp. 1420-1424.

* cited by examiner

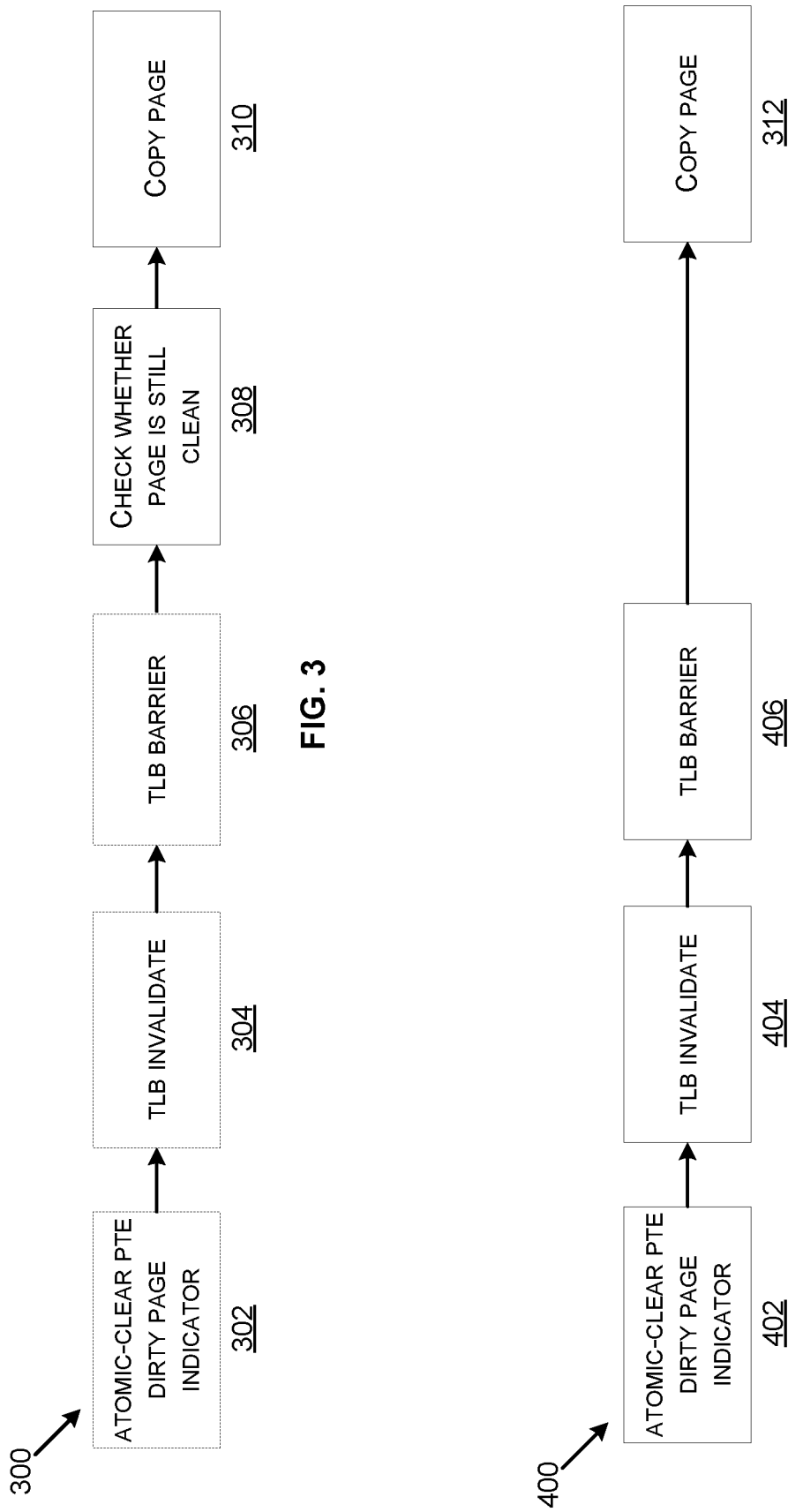

| TAG 800 | VALID INDICATOR 802 | TLB DIRTY PAGE INDICATOR 804 | HOST PHYSICAL ADDRESS (PA) 806 | VMID 808 |
|---|---|---|---|---|
| | | | | TLB 118 |
| | | | | |
| ... | ... | ... | ... | ... |
| | | | | |

FIG. 8

| PAGE DESCRIPTOR ADDRESS 900 | VMID 902 | GUEST PA 904 | PAGE SIZE 906 |
|---|---|---|---|
| | | | |
| ... | ... | ... | ... |
| | | | |

Copy Queue 512

FIG. 9

REDUCING COPY OPERATIONS FOR A VIRTUAL MACHINE MIGRATION

BACKGROUND

Virtual machine migration is the process of moving a virtual machine from one physical host to another. Virtual machine migration may be performed for a number of reasons, e.g., change in workload, server maintenance, faulty server, disaster recovery, etc. Live migration may be performed by pausing the virtual machine, copying all the memory states associated with the virtual machine from a source host to a target host, and resuming the virtual machine. One method to reduce the amount of time the virtual machine is paused is by pre-copying as much of the memory states as possible while the virtual machine is still running on the source host.

BRIEF DESCRIPTION OF THE DRAWINGS

Various embodiments in accordance with the present disclosure will be described with reference to the drawings, in which:

FIG. 3 illustrates a high level method for eliding the copy operations by a processing engine, in a first embodiment of the disclosed technologies;

FIG. 4 illustrates a high level method for delaying the clearing of a dirty page indicator before performing the copy operation by the processing engine to reduce redundant copying operations, in a second embodiment of the disclosed technologies;

FIG. 8 illustrates an example embodiment of a translation lookaside buffer, which may be used to cache translations between the guest physical addresses and the host physical addresses for each guest operating system executing on a host processor;

FIG. 9 illustrates a copy queue configured to store information associated with the copy operations, according to certain embodiments of the disclosed technologies;

DETAILED DESCRIPTION

Figure 1:
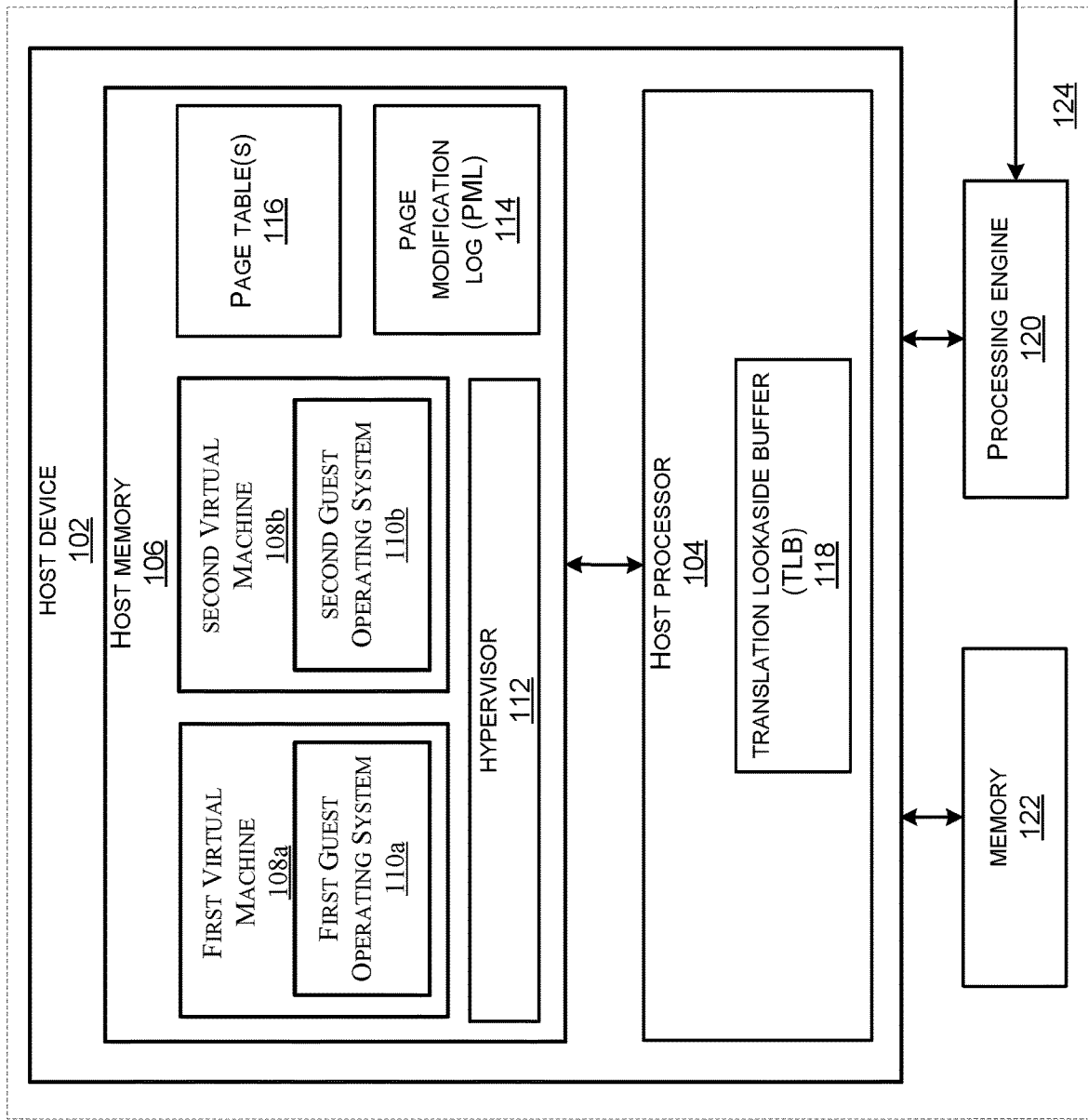
FIG. 1 illustrates an example embodiment of a system for performing live migration of virtual machines.

Multi-tenant compute service systems may typically include a plurality of servers that can host data and be used by multiple clients or organizations to run virtual machine (VM) instances or applications. Generally, multiple tenants or clients can run their respective applications in a virtualized environment on the same hardware. Each VM can execute a respective guest operating system on top of an operating system (OS) of a host device through a hypervisor or a virtual machine manager (VMM). In some cases, a VM executing on the host device may need to be migrated to another device for a number of reasons. For example, the VM may need to be taken offline for an upgrade, bug fixes, or maintenance of the host device. Live migration may allow moving the VM to a target host device without taking the VM or its associated storage offline. Live migration may also be performed for load balancing to efficiently utilize the available computing or memory resources by different applications executing on the host device.

In some implementations, live migration may be performed by pausing the VM, copying the memory states of the VM and of all its processor registers to the target host device, and resuming the VM. Generally, a user may experience some performance reduction during the live migration since some of the memory and network bandwidth may be consumed for the copying operation. In some instances, hundreds of gigabytes of memory may need to be transferred from the source host device to the target host device. In such instances, pausing the VM, and copying all of its associated states to the target host device may result in a noticeable performance reduction, and may not be acceptable by the clients. In some implementations, while the guest OS is still running on the source host device, pre-copying may be performed to copy the memory states associated with the VM to the target host device. However, since the guest OS may still be making changes to the memory states associated with the VM while the copying is going on for the pre-copy operation, the data that has changed since the copy operation started may need to be copied again. In some instances, pages that are written by the guest OS during the copying operating can be tracked and an iterative process to copy those dirty pages to the target host device can be performed until the time to copy the dirty pages and other remaining states is sufficiently small to meet a pause time target for migration. Thus, copying of the pages for the pre-copy operation and then copying of the pages which have been dirtied again can result in a number of useless copying operations. These redundant copying operations may consume additional memory and network bandwidth. Thus, it is desirable to reduce the number of redundant copying operations performed to the target host device as part of the pre-copy operation. A redundant copying operation of a page may be a copying operation which has to be repeated since the page that has been previously copied has been dirtied or modified again.

Embodiments of the disclosed technologies can provide systems and methods to reduce the number of redundant copying operations performed to the target host device as part of the pre-copy operation for live migration of the VMs. According to certain embodiments, a processing engine may perform the copy operation to the target host device. The processing engine may include a processing core, which may be an independent entity. For example, the processing engine may be an input/output card, or one of the processing cores on the host device, which is not running the hypervisor.

In certain embodiments, a host processor, which is executing a guest OS, can keep track of any pages that get modified by the guest OS in a page modification log (PML). For example, in one implementation, when page modification logging is enabled, each write transaction that sets a dirty page indicator (e.g., a dirty bit or flag) in a page table entry (PTE) can also generate an entry in the PML to log a guest physical address (PA) or an intermediate physical address of the guest OS which modified the page. In another implementation, a PML can be created by going through all the PTEs in a page table and logging the guest PAs of all the dirty pages in the PML. The page table may be maintained by the hypervisor for the guest OS. A page may be a fixed-size contiguous block of virtual memory. The hypervisor can monitor the number of pages modified by each guest OS by specifying an available set of PML entries. When the PML is full, the hypervisor can be interrupted to process the modified pages. For example, the hypervisor may process the PTEs by clearing the respective dirty page indicators on the PTEs and queuing all the modified (dirty) pages for copying in a processing engine. The hypervisor may also flush the modified translation lookaside buffer (TLB) entries from the TLB to be consistent with the PTEs. According to certain embodiments, host addresses of the PTEs corresponding to the modified pages may be provided to the processing engine to allow access to the PTEs. For example, the host address of the PTE may be a page descriptor address. The processing engine may take some action based on the contents of the PTEs.

In a first embodiment, software executing on the host processor (e.g., a hypervisor) may clear the dirty page indicator associated with the modified page on the PTE, flush the modified entry out of the TLB, and then queue the modified page in the processing engine to be copied to a target device. The processing engine can access the PTEs using the host address and check the dirty page indicator in the PTE associated with the page just before starting the copying operation. If the page has been modified again (e.g., the dirty page indicator is set again in the PTE), the processing engine may elide (e.g., omit) the copy since another copy may be scheduled in the future by the software.

In a second embodiment, the software does not clear the dirty page indicator and only queues the dirty page for the copy operation in the processing engine. The processing engine may perform an atomic operation to set the page as not dirty (e.g., clear the dirty page indicator) and flush the modified entries out of the TLB right before performing the copying operation thus extending the window of time during which writes to the modified page are captured. For example, in some instances, the page may have been modified again after being queued in the processing engine. By delaying the clearing of the dirty flag indicator by the processing engine can allow more time to combine all subsequent writes into one copy operation thus avoiding performing redundant copy operations.

FIG. 1 illustrates an example embodiment of a system 100 for performing live migration of virtual machines.

The system 100 may include a host device 102 coupled to a processing engine 120 and memory 122. The processing engine 120 may be coupled to a target device 126. The host device 102 may include a host processor 104 coupled to a host memory 106. The host device 102 may include other components which are not shown here for the purposes of simplicity. In some implementations, the system 100 may be part of a server system, which may be configured to provide multi-tenant compute services. For example, the system 100 may provide services such as cloud computing, cloud storage, analytics, web services, databases, applications, deployment services, etc. to different clients. In some implementations, the host device 102, the processing engine 120, and the memory 122 may be part of a multi-core processor system 124. For example, the host processor 104 may include a first processor core, and the processing engine 120 may include a second processor core of the multi-core processor system 124.

The host device 102 may be configured to execute a plurality of virtual machines (VMs) on the host processor 104. For example, a first VM 108a may be executing a first guest operating system (OS) 110a, and a second VM 108b may be executing a second guest OS 110b on the host processor 104. In this specification, a guest OS may also be termed as a guest. The first guest OS 110a executing within the first VM 108a may be assigned a first guest physical address space, and the second guest OS 110b executing within the second VM 108b may be assigned a second guest physical address space. Each of the first guest physical address space and the second guest physical address space may be divided into equal size pages. In some instances, each of the first VM 108a or the second VM 108b may be executing on more than one processor cores of the multi-core processor system 124.

A hypervisor 112 or a virtual machine manager (VMM) can emulate a single device as multiple virtual devices in a virtualized environment. The virtual machines 108a and 108b may be any suitable emulation of a computer system that may be managed by the hypervisor 112. For example, the hypervisor 112 may be configured to create, start, monitor, stop or delete the VMs executing on the host processor 104 (e.g., the first VM 108a and the second VM 108b). In some implementations, the hypervisor 112 can manage access controls, resources, scheduling, isolation, etc. for the VMs 108a and 108b executing the guest OSs 110a and 110b respectively. The hypervisor 112 can also manage the flow of information between software, the virtualized hardware, and the physical hardware.

The host memory 106 may include an SRAM, a flash, a ROM, or any suitable memory. The host memory 106 may include instructions which can be executed to perform the functionalities of the hypervisor 112, the first VM 108a, and the second VM 108b. The host memory 106 may also be used to store a page modification log (PML) 114, and one or more page tables 116.

The page table 116 may comprise page table entries (PTEs) configured to store translations between the guest physical addresses (PAs) and the host PAs for each guest OS executing on the host processor 104. The guest PAs may correspond to a respective guest and may act as intermediate physical memory space allocated to each guest. In some implementations, the guest OS may translate the virtual or logical addresses into the guest PAs associated with the guest. The host PAs may be used to access the memory 122. The memory 122 may be a DRAM, SDRAM, or any suitable memory used to store memory states associated with the VMs executing on the host processor 104. An example page table is discussed with reference to FIG. 6.

Figure 6:
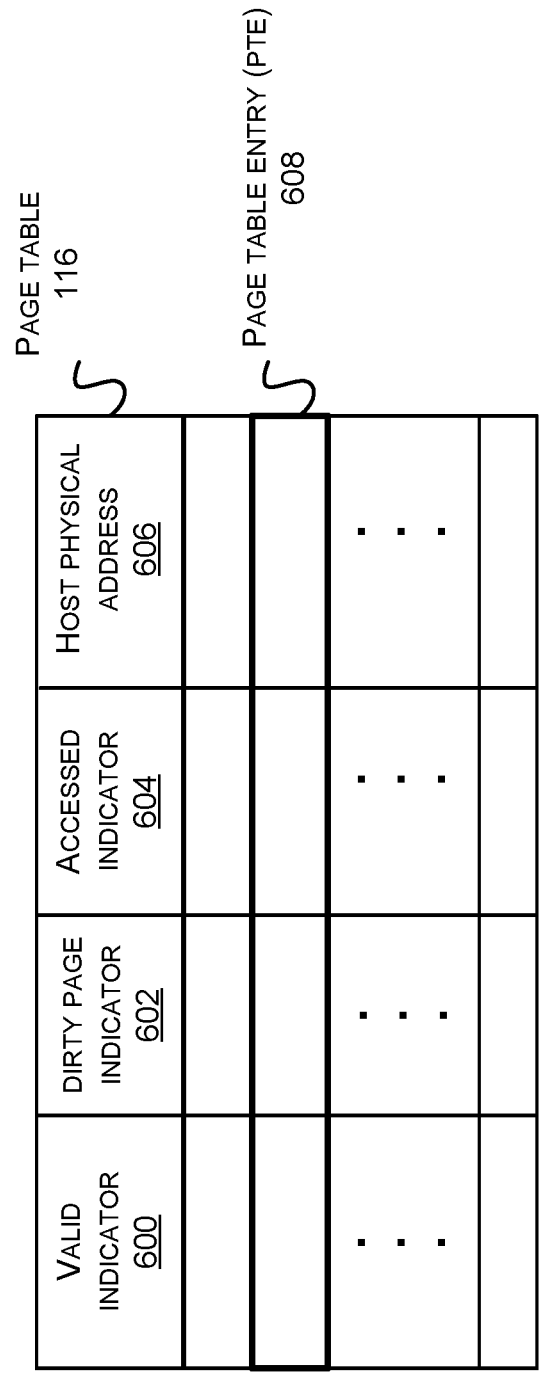
FIG. 6 illustrates an example embodiment of a page table comprising PTEs to store the translations between the guest physical addresses and the host physical addresses.

FIG. 6 illustrates an example embodiment of the page table 116 comprising PTEs to store the translations between the guest PAs and the host PAs. Each PTE in the page table 116 may include a valid indicator field 600, a dirty page indicator field 602, an accessed indicator field 604, and a host PA field 606. Note that the page table 116 may include additional or different fields, which are not shown here for the purposes of simplicity. In some implementations, a PTE of the page table 116 may also be called a page descriptor.

A page descriptor address may correspond to a physical address of a frame (a block of physical memory) where the PTE resides in the host memory 106.

The valid indicator field 600 may be used to indicate whether a given PTE 608 is a valid entry or an invalid entry. For example, a valid entry may indicate that a translation for a given guest PA exists or is present in the PTE 608.

The dirty page indicator field 602 may be used to indicate that a page for the given guest PA has been modified by the guest. For example, the hypervisor 112 (or hardware associated with the host processor 104) may set the dirty page indicator field 602 to "1" in the PTE 608 to indicate that the corresponding page is dirty or has been modified as a result of a write performed at the given guest PA. A value of "0" for the dirty page indicator field 602 may indicate that the page is not dirty.

The accessed indicator field 604 may be used to indicate that the given PTE 608 has been accessed recently. For example, the PTE 608 may have been used for translating the given guest PA into the host PA.

The physical address field 606 may provide the host physical address of the physical memory 122 where the memory states associated with the VM can be copied from for live migration to the target device 126.

Referring back to FIG. 1, the PML 114 may be used to track whether a page has been modified by a guest OS executing on the host processor 104, e.g., the guest OS 110*a* or 110*b*. For example, in some instances, while pre-copying for the live migration of a VM, the guest OS executing within the VM may continue to make changes to the memory associated with the VM. Any modification of the pages performed by the guest OS may be logged in the PML 114 instead of interrupting the hypervisor 112 every time the guest OS makes a change. The PML 114 may be implemented using a circular buffer or another suitable memory structure. An example embodiment of the PML is described with reference to FIG. 7.

Figure 7:
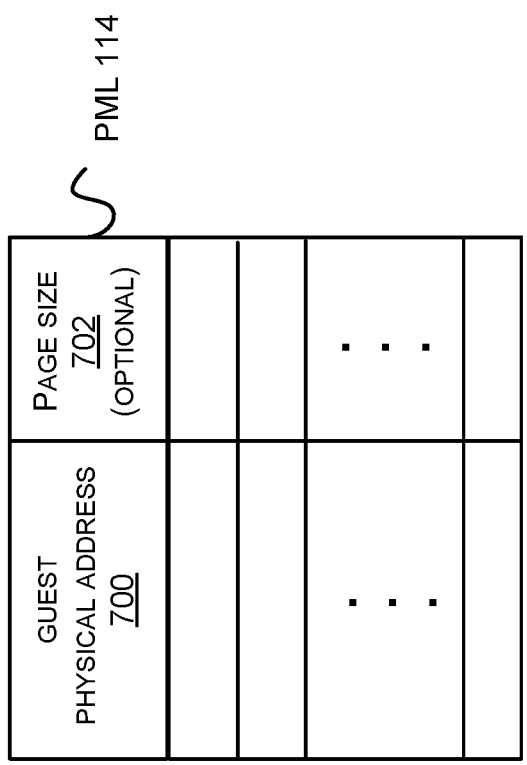
FIG. 7 illustrates an example embodiment of a page modification log, which may be used to perform page modification logging for live migration of the virtual machines.

FIG. 7 illustrates an example embodiment of the PML 114, which may be used to perform page modification logging for live migration of the VMs.

The PML 114 may comprise a guest PA field 700, and an optional page size field 702. In some implementations, the PML 114 may be implemented as a circular buffer comprising 512 entries, and each entry can be 64-bits; however, other configurations are possible. The guest PA 700 is the guest physical address associated with the guest OS executing in the VM, e.g., the guest OS 110*a* or 110*b*. The page size field 702 may correspond to a size of the page. In some embodiments, the guest PA 700 may include a portion of the guest physical address. For example, in some implementations, the guest PA 700 may only store certain bits of the guest physical address that do not correspond to the page size. As an example, for a 4 KB page size, the guest PA 700 may not store lowest 12-bits of the guest physical address, and the page size field 702 may indicate the 4 KB page size. In some implementations, the hypervisor 112 may first enable the page modification logging to allow logging the guest PAs in the PML 114. When a write to a PA associated with the guest is performed by the guest OS, the hypervisor 112 may set the dirty page indicator field 602 to "1" in the PTE of the page table 116. In one implementation, each write transaction that sets the dirty page indicator field 602 to "1" in the PTE can also generate an entry in the PML 114 to log the guest PA 700 of the modified pages. In another implementation, the PML 114 can be created by going through all the PTEs in the page table 116 and logging the guest PAs of all the dirty pages in the PML 114. Once the PML 114 gets full, or a number of entries logged in the PML 114 reach a certain predetermined value, the hypervisor 112 may be interrupted to process the PTEs. In some implementations, the hypervisor 112 can monitor the PML 114 to determine if the number of logged entries has reached a certain value before processing the PTEs.

Referring back to FIG. 1, the host processor 104 may use a translation lookaside buffer (TLB) 118 to cache translations between the guest PAs and the host PAs for each guest OS executing on the host processor 104. When an access to the memory 122 is requested by a VM, the TLB 118 may be searched for a mapping using the guest PA for the guest executing in the VM, and a VMID associated with the VM. If a match is found (a TLB hit), a corresponding host PA is provided by the TLB 118. If the mapping does not exist in the TLB 118 (a TLB miss), a page table walk may be performed and the TLB 118 may be updated to include the host PA. In some instances, the TLB 118 may be full, and a replacement policy (e.g., least recently used) may be used to replace an existing TLB entry with a new TLB entry. An example embodiment of the TLB 118 is discussed with reference to FIG. 8.

FIG. 8 illustrates an example embodiment of the TLB 118, which may be used to cache translations between the guest addresses and the host PAs for each guest OS executing on the host processor 104.

Each entry in the TLB 118 may include a tag 800, a valid indicator 802, a TLB dirty page indicator 804, a host PA 806, and a VMID 808. Note that the TLB 118 may include different or additional fields, which are not shown here for the purposes of simplicity. The tag 800 may correspond to a portion of the guest PA which may be mapped to the host PA 806 in the memory 122. Note that the TLB 118 includes mapping between the guest PA and the host PA, however, other implementations of the TLB 118 are possible. For example, one implementation may include a direct mapping between the virtual or logical addresses of the guest to the host PAs. Another implementation may include two levels of mapping, e.g., a first mapping from the virtual or logical addresses of the guest to the guest PAs, and a second mapping from the guest PAs to the host PAs. The TLB 118 is shown to include the second mapping for the ease of simplicity. The valid indicator 802 may indicate whether a given TLB entry is valid or invalid. In some implementations, invalidating or flushing the TLB entry may correspond to setting the valid indicator 802 to "0." The VMID 808 may represent an identifier associated with a VM. The TLB dirty page indicator 804 may be used to indicate that the guest PA for a specific VMID has been modified and can be set when a page is written by the guest. In some instances, an entry of the TLB 118 for a given guest PA may be flushed or invalidated for the specific VMID 808 using the tag 800 to be consistent with a PTE associated with that guest PA in the page table 116 when the dirty page indicator 602 is cleared in that PTE.

Referring back to FIG. 1, the processing engine 120 may be coupled to a target device 126. The target device 126 may be another computer or a memory device where the data associated with any of the VMs executing on the host device 102 can be migrated to. The processing engine 120 may be used to perform the copy operation to copy the data to the target device 126, e.g., using a DMA controller.

The processing engine 120 may also perform copy operations that are part of pre-copying for the live migration of the VM to copy the memory states associated with the VM to the target device 126. However, while pre-copying for the live migration of a VM, the guest may continue to make changes to the memory states associated with the VM. Thus, the pages that have changed since the copy operation started may need to be copied again. Generally, the hypervisor 112 may clear the dirty page indicators in the respective PTEs of the pages that have been modified and schedule the copy operations to be performed by the processing engine 120. The processing engine may perform redundant copy operations of the modified pages, which may reduce the performance of the system 100. A detailed method for the live migration of the VM is discussed with reference to FIG. 2.

Figure 2:
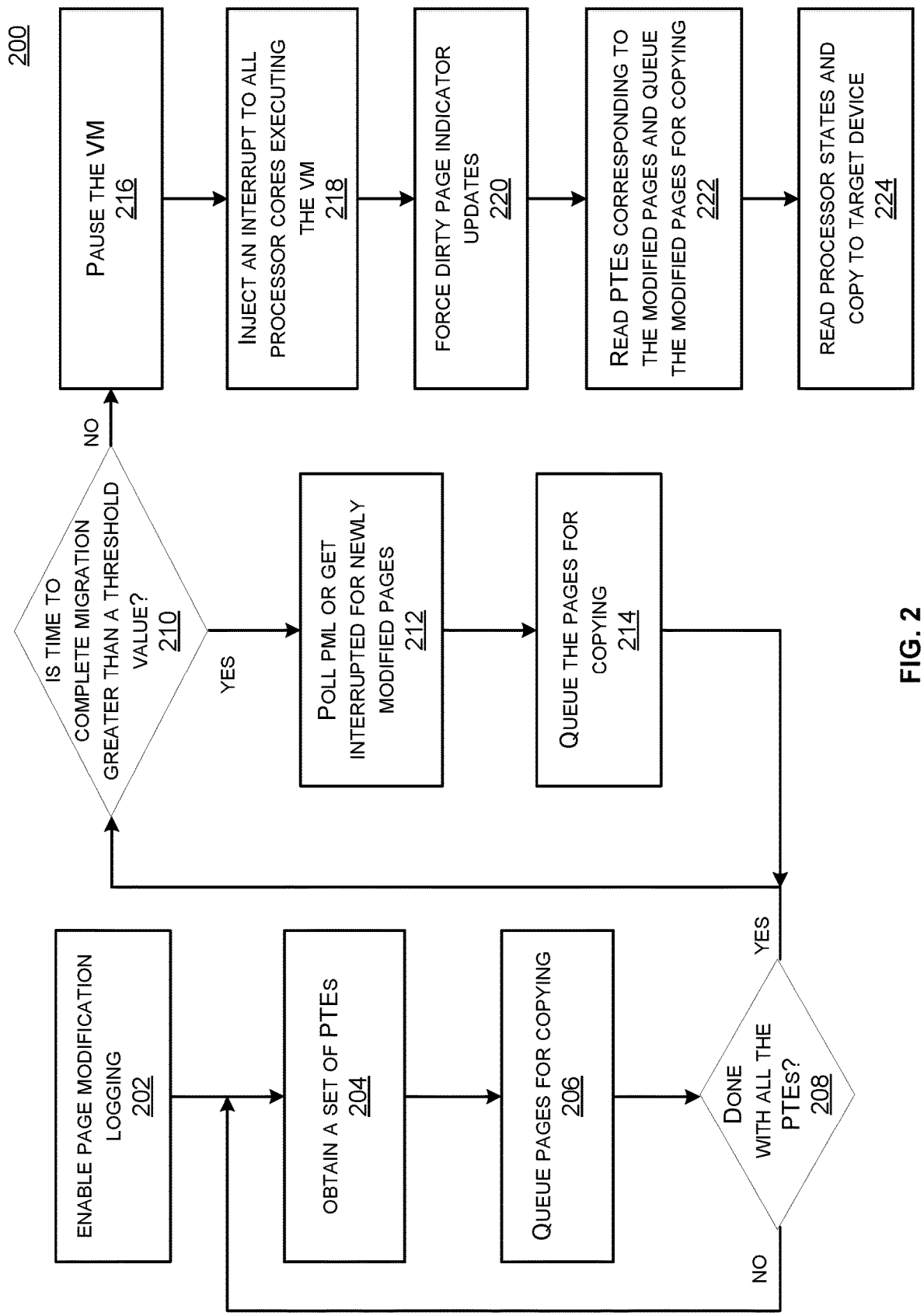
FIG. 2 illustrates an example method executed by a hypervisor for live migration of a virtual machine.

FIG. 2 illustrates an example method 200 executed by a hypervisor for live migration of a VM. For example, the method 200 may be executed by the hypervisor 112 for the live migration of the first VM 108*a* to the target device 126.

In a step 202, the hypervisor 112 may enable the page modification logging to enable tracking of the pages modified by the guest executing in the VM. Referring back to FIG. 1, enabling the page modification logging may allow logging the pages modified by the first guest OS 110*a* in the PML 114 for migrating the first VM 108*a* to the target device 126.

In a step 204, the hypervisor 112 may obtain a set of PTEs from the page table 116 associated with the first guest OS 110*a*. The set of PTEs may correspond to the pages mapped to the first guest OS 110*a*, which need to be copied to the target device 126.

In a step 206, the hypervisor 112 may queue pages for copying by the processing engine 120. The pages for copying may include the pages corresponding to the set of PTEs in the page table 116. In some implementations, the hypervisor 112 may provide information associated with the copy operations of the pages to the processing engine 120. For example, the information may include a VMID, a page descriptor address, a page size, and a host physical address for each page to be copied. The processing engine 120 may perform the copy operation based on the information associated with the copy operation for each page to be copied.

In a step 208, the hypervisor 112 may determine whether all the PTEs for the first guest OS 110*a* have been copied. If not, the hypervisor 112 may obtain a next set of PTEs from the page table 116 and queue the pages corresponding to the next set of PTEs for copying by the processing engine 120 in the step 206. If all the PTEs are done, and the VM is not busy, the hypervisor 112 may not need to perform iterative copy operations since the pages may not be modified. The hypervisor 112 may also read the relevant register states for all the processor cores which were executing the first VM 108*a*, and copy to the target device 126. In this case, the live migration of the VM is completed. If the VM is busy and needs to be paused to complete the VM migration due to some pages that were modified by the first guest OS 110*a*, the hypervisor 112 may determine the time to complete the migration based on the number of pages remaining to be copied by the processing engine 120.

In a step 210, the hypervisor 112 may determine whether the time to complete the VM migration is greater than a threshold value. In some implementations, the threshold value may be based on a pause time target, e.g., the time duration which may be acceptable for pausing the VM to complete the migration. The hypervisor 112 may determine a total time to complete the migration based on the number of entries in a copy queue in the processing engine 120.

In a step 212, if the time to complete the VM migration is greater than the threshold value, the hypervisor 112 may continue monitoring the pages that are modified by the first guest OS 110*a*. For example, the hypervisor 112 may either monitor the PML 114 for a certain number of modified pages to get logged, or get interrupted when the newly modified pages are logged in the PML 114.

In a step 214, the hypervisor 112 may queue the pages for copying in the processing engine 120. The hypervisor 112 may provide information associated with the copy operation for each page to be copied, e.g., the VMID, the page descriptor address, the page size, and the host PA, to the processing engine 120. The hypervisor 112 may continue executing the steps 212 and 214 to monitor for the newly modified pages and queue the modified pages in the processing engine 120 while the time to complete the migration is more than the threshold in the step 210. As the number of newly modified pages gets fewer, the time to complete the migration may get smaller than the threshold value in the step 210, the VM can be paused to complete the migration within the pause time target.

In a step 216, the hypervisor 112 may pause the VM when the time to complete the migration is within the pause time target. For example, pausing the VM may include stopping any input/output transactions with the first VM 108*a*, and stopping any virtual CPUs assigned to the guests from performing any functions.

In a step 218, the hypervisor 112 may inject an interrupt into all the processor cores entering the hypervisor 112. For example, the hypervisor 112 may inject an interrupt into the host processor 104, and any other processor cores of the multi-core processor system 124 executing the first VM 108*a*.

In a step 220, the hypervisor 112 may force updates of the dirty page indicators in the PTEs in the respective page table 116, or the TLB 118 on the processor cores executing the first VM 108*a*.

In a step 222, the hypervisor 112 may read all the entries of the PMLs on all the processor cores for the modified pages, and queue the modified pages in the processing engine 120 for copying to the target device 126.

In a step 224, the hypervisor 112 may read the relevant register states for all the processor cores which were executing the first VM 108*a*, and copy to the target device 126. This may complete the migration of the first VM 108*a* to the target device 126.

As the new pages are modified by the first guest OS 110*a*, redundant copy operations may be performed while the time to copy the newly modified pages and other remaining states is more than the pause time target for migration. For example, as shown in the steps 210-214, the newly modified pages may be queued in the PML 114 and the hypervisor 112 may continue queuing the modified pages in the processing engine 120 for copying until the pause time target is met. Eventually, this process may converge; however, the iterative copy operations may consume the memory and network bandwidth thus reducing the system performance.

Embodiments of the disclosed technologies can provide systems and methods to elide redundant copying operations for live migration of the VMs. In a first embodiment, a processing engine can access the PTE to check if the page, which is queued for the copying operation, has been modified again after the page was scheduled for the copying operation. If the page has been modified again (e.g., the dirty page indicator is set again in the PTE), the processing engine may elide the copy since another copy may be scheduled in the future by the hypervisor. In a second embodiment, the processing engine may perform an atomic operation to set the page as not dirty (e.g., clear the dirty page indicator in the PTE) right before performing the copying operation thus extending the window of time during which any future writes to the modified page can be captured.

Referring back to FIG. 2, in the first embodiment, when the pages are queued in the processing engine for copying as shown in the step 214, before performing the copy operation, the processing engine 120 can check if the page has been modified again, e.g., by reading the dirty page indicator 602 in the PTE corresponding to the page. If the page has been modified again (e.g., the dirty page indicator 602 is set in the PTE), the processing engine can omit or skip the copy operation for that page. This will be further explained with reference to FIG. 3.

In the second embodiment, when the pages are queued in the processing engine 120 for copying as shown in the step 214, the processing engine 120 can perform an atomic operation to clear the dirty page indicator 602 in the PTE corresponding to the modified page right before performing the copying operation. This will be further explained with reference to FIG. 4.

FIG. 3 illustrates a high level method 300 for eliding the copy operations by a processing engine, in a first embodiment of the disclosed technologies. Steps 302, 304, and 306 may be performed by software (e.g., the hypervisor 112). Steps 308 and 310 may be performed by hardware (e.g., the processing engine 120).

The method 300 may be performed for scheduling the copy operation for live migration of a VM, as discussed with reference to FIG. 2. For example, page modification logging may be enabled to track the pages modified by the guest executing in the VM e.g., the first VM 108a. The pages modified by the first guest OS 110a may be logged in the PML 114. Once the PML 114 is full, the hypervisor 112 may be interrupted to process the entries of the PML 114 and schedule the copy operations.

In a step 302, the hypervisor 112 may clear the dirty page indicator 602 in the PTE (e.g., the PTE 608) corresponding to the modified page before scheduling the copy operation. For example, the hypervisor 112 may perform an atomic operation to read the dirty page indicator 602 in the PTE and clear the dirty page indicator 204. The dirty page indicator 204 may indicate that the PTE corresponding to the page may have been modified by the first guest OS 110a at the guest PA 700 logged in the PML 114 for the modified page. As discussed previously, the guest PA 700 may be a portion of the guest PA of the modified page. The optional page size 702 may be used to determine the size of the modified page. The atomic operation may allow the hypervisor 112 to perform a read-modify-write of the dirty page indicator 204 in a single step, e.g. by executing an atomic instruction.

In a step 304, the hypervisor 112 may invalidate the corresponding entry in the TLB 118 using a VMID 808 associated with the first VM 108a, and the guest PA 700 as the tag 800 to be consistent with the PTE for the modified page. Thus, the TLB entry associated with the VMID that has been modified for the guest PA 700 can be flushed. For example, the hypervisor 112 may invalidate, based on the VMID 808 of the first VM 108a, corresponding TLB entry in the TLB 118 associated with the guest PA 700 that may have been modified. In some implementations, invalidating the TLB entry may correspond to setting the valid indicator 802 to "0." Invalidating the TLB entry can allow any future writes to the guest PA 700 to trigger setting of the dirty page indicator 602 again in the PTE in the page table 116.

In a step 306, the hypervisor 112 may execute a barrier or an operation to ensure that the invalidation of the TLB entry has been completed across all the multiple processor cores the first VM 108a may be executing on. For example, a barrier may be executed using an instruction or an interrupt to ensure completion of the invalidation. The interrupt may be an inter-processor interrupt from the multiple processor cores except the processor core of the processing engine 120. Once the hypervisor 112 determines that the invalidation of the TLB entry has been completed, the hypervisor 112 may schedule copying of the modified page corresponding to the guest PA 700.

In a step 308, according to the first embodiment, before performing the copy operation, the processing engine 120 may check whether the page has been modified again after clearing of the dirty page indicator 602 in the PTE by the hypervisor 112. For example, the processing engine 120 may read the dirty page indicator 602 in the PTE using the page descriptor address provided by the hypervisor 112 and determine whether the page is still clean or has been modified after the copy operation was scheduled. If the page has been modified (e.g., the dirty page indicator is set to "1"), the processing engine 120 can elide the copy operation in the step 310 since a future copy operation may be scheduled for the modified page. Thus, redundant copy operations can be avoided by checking the current status of the dirty page indicator 602 before performing the copy operation. If the page has not been modified (e.g., the dirty page indicator is "0"), the processing engine 120 can continue with the copy operation in the step 310.

In a step 310, the processing engine 120 may perform the copy operation for the modified page to a target physical address in the target device 126. For example, the DMA controller 126 may transfer the modified page to the target device 126 at the memory location corresponding to the target physical address. In some embodiments, the processing engine 120 may execute the steps 308 and 310 asynchronously to the host processor 104. For example, queueing of the copy operations by the hypervisor 112 can be performed independently of the checking of the dirty page indicator 602 and the copy operations by the processing engine 120.

FIG. 4 illustrates a high level method 400 for delaying the clearing of the dirty page indicator before performing the copy operation by the processing engine to reduce redundant copying operations, in a second embodiment of the disclosed technologies. As shown in FIG. 4, steps 402, 404, and 406 may be performed by hardware (e.g., the processing engine), in addition to the step 312.

In a step 402, the processing engine 120 may clear the dirty page indicator 602 in the PTE corresponding to the modified page, instead of the hypervisor 112 clearing the dirty page indicator 602 as done in the step 302. In some instances, the page may have been modified prior to being scheduled for the copy operation, and later modified one or more times after being scheduled for the copy operation. By allowing the processing engine 120 to clear the dirty page indicator 602 just before performing the copy operation can extend the window during which any additional writes to the modified page in the PTE can be captured. In some embodiments, information associated with the modified page may be provided to the processing engine, which can be used by the processing engine to locate the PTE corresponding to the modified page in the page table 116, and clear the dirty page indicator in the PTE. For example, the information may include a page descriptor address of the PTE and a page size. In some embodiments, the processing engine 120 can issue a transaction to the host processor 104 to clear the dirty page indicator 602 in the PTE using an atomic operation, e.g., using a compare and swap operation.

In a step 404, the processing engine 120 may invalidate the corresponding TLB entry to be consistent with the PTE in the page table 116, which had the dirty page indicator 602 cleared. Thus, the TLB entry associated with the VMID that has been modified for the guest PA 700 can be flushed. For example, the processing engine 120 may invalidate, based on the VMID 808 of the first VM 108*a*, a corresponding TLB entry in the TLB 118 associated with the guest PA 700, which may have been modified. Invalidating the TLB entry can allow any future writes to the guest PA 700 to trigger setting of the dirty page indicator 602 again in the PTE. In some implementations, invalidating the TLB entry may correspond to setting the valid indicator 802 to "0." In some implementations, instead of invalidating single TLB entries, which may have a bigger overhead, the processing engine 120 may invalidate a set of TLB entries for a set of pages that have been modified in the page table 116.

In a step 406, the processing engine 120 may execute a barrier or an operation to ensure that the invalidation of the TLB entry has been completed across all the multiple processor cores the first VM 108*a* may be executing on. For example, a barrier may be executed using an instruction or an interrupt to ensure completion of the invalidation. The interrupt may be an inter-processor interrupt from the multiple processor cores except the processor core of the processing engine 120. Once the processing engine 120 determines that the invalidation of the TLB entry has been completed, the processing engine 120 may start the copy operation in step 312 as discussed previously. By delaying the clearing of the dirty page indicator 602 by the processing engine 120 until it is just about to copy can combine all the subsequent writes to the processing engine 120 in a single copy, thus getting rid of redundant copy operations. In some embodiments, the processing engine 120 may execute the steps 402, 404, 406, and 312 asynchronous to the host processor 104. For example, queueing of the copy operations by the hypervisor 112 can be performed independently of the clearing of the dirty page indicator 602, TLB invalidation, and the copy operations by the processing engine 120.

Figure 5:
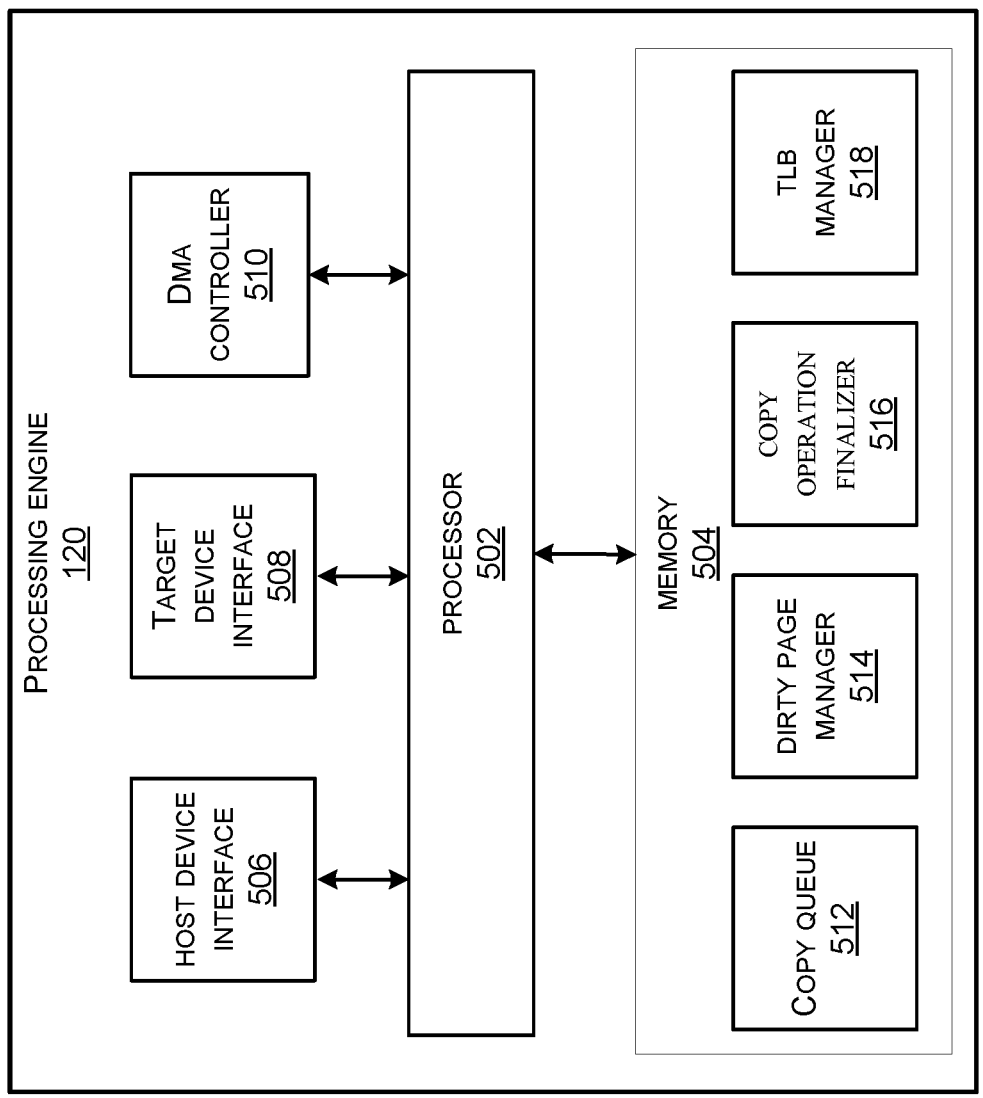
FIG. 5 illustrates components of the processing engine, according to certain embodiments of the disclosed technologies.

FIG. 5 illustrates components of the processing engine 120 according to certain embodiments of the disclosed technologies.

The processing engine 120 may include a processor 502 coupled to a host device interface 506, a target device interface 508, a DMA controller 510, and memory 504. The memory 504 may include a copy queue 512, a dirty page manager 514, a copy operation finalizer 516, and a TLB manager 518. The processing engine 120 may be part of an I/O adapter device, or part of a multi-core processor system such as the system 124. For example, the processing engine 120 may include a first processor core, and the host processor 104 may include a second processor core. In some implementations, the host processor 104 and the processing engine 120 may be on the same die. For example, the system 124 may be implemented as a system-on-chip, or any suitable integrated circuit, and the first processor core of the processing engine 120 may not be running the hypervisor 112. The target device 126 may be another computer or a memory device where the data associated with any of the VMs executing on the host device 102 can be migrated to.

The host device interface 506 may be configured to enable communication between the host device 102 and the processing engine 120. For example, the host device interface 506 may include a peripheral component interconnect express (PCIe) interface, or any suitable interface.

The target device interface 508 may be configured to enable communication with the target device 126 and the processing engine 120. The target device 126 may include a local server, a remote server, or another memory device where the data for live migration may need to be copied. For example, the target device interface 126 may include a network interface, a serial interface, a PCIe interface, a SATA interface, or any suitable interface which may be used to transfer data associated with a VM from the memory 122 to a physical memory in the target device 126.

The DMA controller 510 may be configured to perform DMA operations to copy the data associated with the VM from the memory 122 to the target device 126 for the live migration of the VM. The DMA controller 510 may be used to offload the copying operation to minimize the usage of the host processor 104 and the processor 502. The DMA controller 510 may perform the copy operations asynchronously to the scheduling of the copy operations by the hypervisor 112.

The copy queue 512 may include memory to queue pages that need to be copied as part of the live migration of the VMs executing on the host device 102. The copy queue 128 may be implemented using any type of data structure, e.g., stacks, fifos, arrays, etc. According to certain embodiments, the copy queue 512 may be written by the hypervisor 112 executing on the host processor 104 to schedule the copy operations of the pages which were modified by the guests executing within the VMs. The copy queue 512 may receive from the hypervisor 112 information associated with copy operation for each page to be copied, e.g., a guest physical address, a page descriptor address, a VMID for the VM, and a page size. An example copy queue 512 is discussed with reference to FIG. 9.

FIG. 9 illustrates the copy queue 512 configured to store information associated with a copy operation to be performed for a page, according to certain embodiments of the disclosed technologies. The copy queue 512 may store a page descriptor address 900, a VMID 902, a guest PA 904, and a page size 906 associated with each page received from the hypervisor 112.

The page descriptor address 900 may correspond to a physical address of a PTE corresponding to the page in the page table 116. For example, the page descriptor address 900 may correspond to a physical address of a frame where the page resides in the memory 122. In the first embodiment, the page descriptor address 900 may be used by the processing engine 120 to read the PTE in the page table 116 to determine whether the page has been modified again, after the page was scheduled to be copied, based on the dirty page indicator 602 in the PTE. In the second embodiment, the page descriptor address 900 may be used by the processing engine 120 to read the PTE in the page table 116, and clear the dirty page indicator 602 in the PTE just before performing the copy operation.

The VMID 902 may be associated with a VM executing the guest on the host processor 104. The VMID 902 for a given VM may be used to locate a PTE in the TLB 118 for the given guest PA 904 to invalidate a TLB entry corresponding to the PTE for the modified page in the page table 116, which had the dirty page indicator 602 cleared. The guest PA 904 may correspond to a guest physical address associated with a guest that modified the page. In some embodiments, the VMID 902 and the guest PA 904 may be used by an input/output memory management unit (not shown) to translate to a physical address in the memory 122 where the data associated with the VM may be copied from. In other embodiments, the hypervisor 112 may provide the physical address to the copy queue 512 instead of or in addition to the guest PA 904.

The page size 906 may indicate a page size for the modified page that needs to be copied. The page size 906 may correspond to size of a contiguous block of memory. The page size 906 may be specified based on the processor architecture or system specification. Some examples of the page size 606 may include 4 KB, 64 KB, 16 MB, etc.

Referring back to FIG. 5, the dirty page manager 514 may be configured to read a PTE corresponding to the modified page. For example, in the first embodiment, the dirty page manager 514 may read the PTE to determine if the page has been modified by the guest before the copy operation is performed by the DMA controller 510. The dirty page manager 514 may read the PTE using the page descriptor address 900 provided by the hypervisor 112 for the PTE. For example, the page descriptor address 900 may be stored in the copy queue 512 corresponding to the modified page. In the second embodiment, the dirty page manager 514 may also be configured to determine that the page has been modified based on the dirty page indicator 602 and clear the dirty page indicator 602 in the PTE. The dirty page manager 514 may execute an atomic operation to read the PTE and clear the dirty page indicator 602 in the PTE in a single step.

The copy operation finalizer 516 may be configured to determine if a copy operation has to be omitted or performed based on whether the page has been modified. In the first embodiment, the copy operation finalizer 516 may omit the copy operation upon determining that the page has been modified again. For example, if the page has been modified again (e.g., the dirty page indicator 602 is set again in the PTE), the copy operation finalizer 516 may omit the copy operation since another copy may be scheduled in the future by the hypervisor 112. Omitting the copy operation may result in not performing, or avoiding that copy operation for the given page. If the copy operation has to be performed, the copy operation finalizer 516 may issue a transaction to the host device 102 with the VMID 902 and the guest PA 904, which may be converted to a physical address in the memory 122 by an IOMMU (not shown) to access the data associated with the VM.

The TLB manager 518 may be configured to perform TLB maintenance to update the TLB entry with the clearing of the dirty page indicator 602 in the PTE, in the second embodiment. For example, the TLB manager 518 may invalidate an entry in the TLB 118 corresponding to the PTE using the VMID 902 and the guest PA 904. For example, the TLB manager 518 may set the valid indicator 802 to "0" to invalidate a TLB entry to be consistent with the PTE in the page table 116 corresponding to the modified page. Thus, the TLB entry associated with the VMID that has been modified for the guest PA 904 can be flushed. Invalidating the TLB entry can allow any future writes to the guest PA 904 to trigger setting of the dirty page indicator 602 again in the PTE. The TLB manager 518 may also be configured to execute a barrier or an operation to ensure that the invalidation of the TLB entry has been completed across all the multiple processor cores the VM may be executing on. For example, a barrier may be executed using an instruction or an interrupt to ensure completion of the invalidation. The interrupt may be an inter-processor interrupt from the multiple processor cores except the processor core of the processing engine 120.

Figure 10:
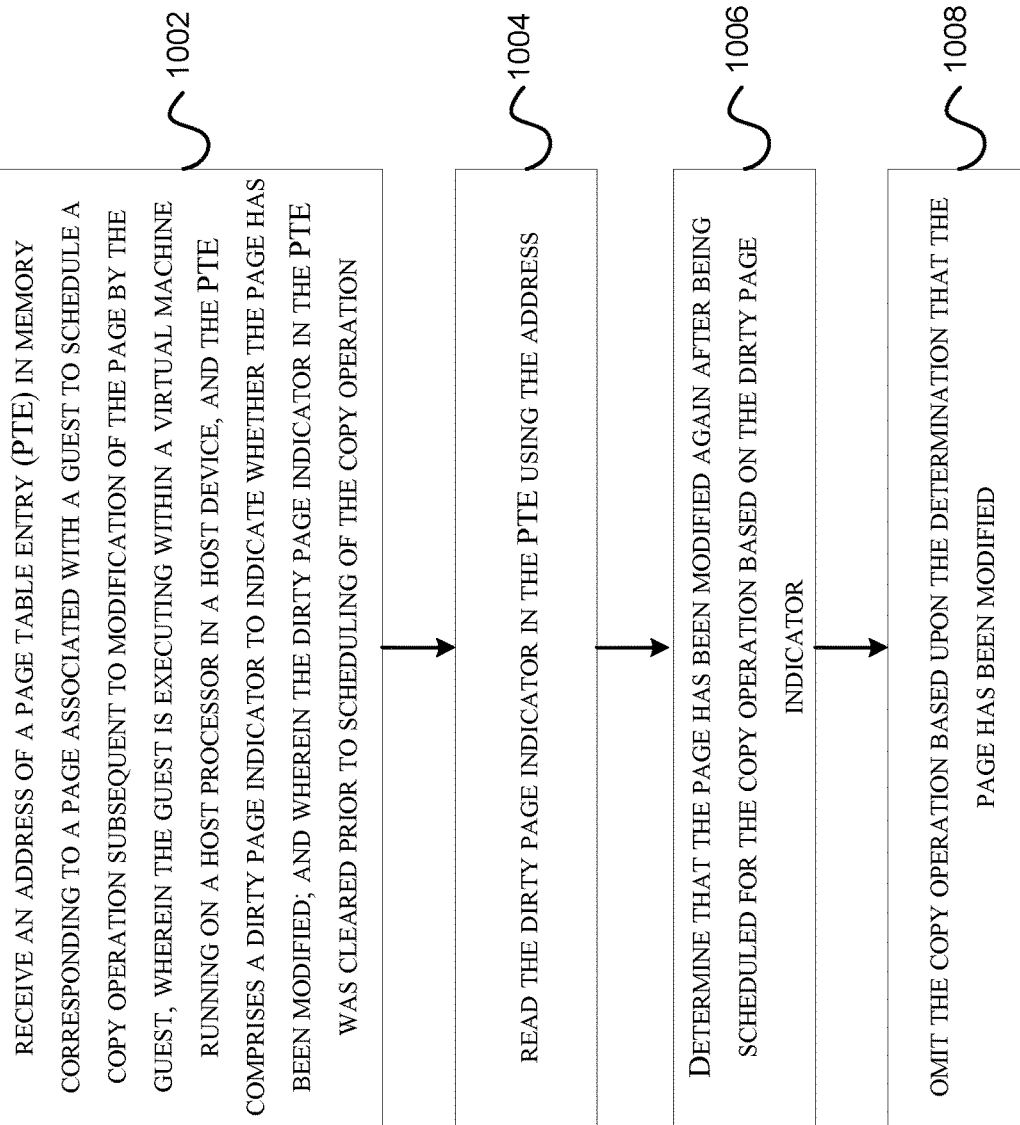
FIG. 10 illustrates a method to elide redundant copy operations for VM migration according to the first embodiment.

FIG. 10 illustrates a method 1000 to elide or omit redundant copy operations for VM migration according to the first embodiment. The method 1000 may be executed by the processing engine 120, as discussed with reference to FIG. 3.

In a step 1002, a processing engine receives an address of a PTE in memory corresponding to a page associated with a guest to schedule a copy operation subsequent to modification of the page by the guest. The guest is executing within a VM running on a host processor in a host device. The PTE comprises a dirty page indicator to indicate whether the page has been modified. The dirty page indicator in the PTE was cleared prior to scheduling of the copy operation. For example, the processing engine 120 may receive an address of the PTE 608 in the host memory 106 corresponding to a page associated with the first guest OS 110*a* to schedule a copy operation subsequent to modification of the page by the first guest OS 110*a*. The address of the PTE 608 may be the page descriptor address 900 received in the copy queue 512. The first guest OS 110*a* may be executing within the first VM 108*a* on the host processor 104 in the host device 102.

As discussed with reference to FIG. 3, prior to the step 1002, the hypervisor 112 executing on the host processor 104 may have been instructed to start the migration of the first VM 108*a* to the target device 126. The hypervisor 112 may enable page modification logging to start logging the guest PAs 700 in the PML 114 corresponding to the pages modified by the first guest OS 110*a*. The hypervisor 112 may schedule the copy operations of the initial PTEs to the target device 126 as part of the pre-copy operation. The DMA controller 510 may perform the copy operations to copy memory states associated with the first VM 108*a* from the memory 122 to a target host memory in the target device 126 using the information associated with the copy operations provided by the hypervisor 112 in the copy queue 512 for each page. The information associated with the copy operations may include the page descriptor address 900, the VMID 902, the guest PA 904, and the page size 906. For example, in some implementations, the copy operation finalizer 516 may issue a transaction to the host device 102 with the VMID 902 and the guest PA 904, which may be converted to a physical address in the memory 122 by an IOMMU (not shown) to access the data associated with the first VM 108*a*.

However, while the initial copy operation is being performed by the processing engine 120, in some instances, the first guest OS 110*a* may continue to make changes to the pages at the guest PAs 700 asynchronously to the processing engine 120. Thus, the pages which have been modified since the initial copy was performed have to be copied again. The dirty page indicator 602 in the PTE 608 may be used to indicate whether the page has been modified, and the guest PAs of the modified pages may be logged in the PML 114 as the guest PAs 700. As discussed in the step 302 of FIG. 3, the hypervisor 112 may clear the dirty page indicator 602 in the PTE 608 before scheduling the copy operation to copy the modified page to the target device 126. For example, the hypervisor 112 may execute an atomic operation to read and clear the dirty page indicator 602 in the PTE 608 in a single step. The hypervisor 112 may also invalidate or flush a corresponding entry in the TLB 118 to allow any future writes to the guest PA 700 to trigger setting of the dirty page indicator 602 again in the PTE 608 in the page table 116, as discussed in the step 304 of FIG. 3. The hypervisor 112 may also execute an operation or a barrier to ensure that the invalidation of the TLB entry has been completed across all the multiple processor cores the first VM 108*a* may be executing on before scheduling the copying of the modified page corresponding to the guest PA 700, as discussed in the step 306 of FIG. 3.

The hypervisor 112 can now schedule the copy operation by providing the page descriptor addresses of the PTE 608 corresponding to the modified page in the copy queue 512 along with other information, e.g., the VMID 902, the guest PA 700 of the modified page, and the page size 702 via the host device interface 506. For example, the guest PA 700 of the modified page may be logged as the guest PA 904, and the page size 702 may be logged as the page size 906 in the copy queue 512.

The processing engine 120 may read the dirty page indicator in the PTE using the address prior to initiating the copy operation. Referring back to FIG. 5, the dirty page manager 514 may read the dirty page indicator 602 in the PTE 608 using the page descriptor address 900 via the host device interface 506. The page descriptor address 900 may be used to provide a location (e.g., a frame number) of the PTE 608 in the host memory 106.

The processing engine 120 may determine that the page has been modified again after being scheduled for the copy operation based on the dirty page indicator. For example, before performing the copy operation, the processing engine 120 may check whether the page is still clean, as discussed in the step 308 of FIG. 3. The dirty page manager 514 may determine that the page has been modified again based on the value of the dirty bit indicator 602 in the PTE 608. For example, a value of "1" for the dirty bit indicator 602 may indicate that the page has been modified, and a value of "0" for the dirty bit indicator 602 may indicate that the page has not been modified.

The processing engine 120 may omit the copy operation based upon the determination that the page has been modified. The copy operation finalizer 516 may omit the copy operation if the dirty bit indicator 602 is set to "1" in the PTE 608 since the modified page may again be queued in the copy queue 512, thus eliding the redundant copy operation.

As discussed above using the method 1000, according to the first embodiment, redundant copy operations can be elided by checking if the page has been modified again before performing the copy operation by the processing engine 120.

Figure 11:
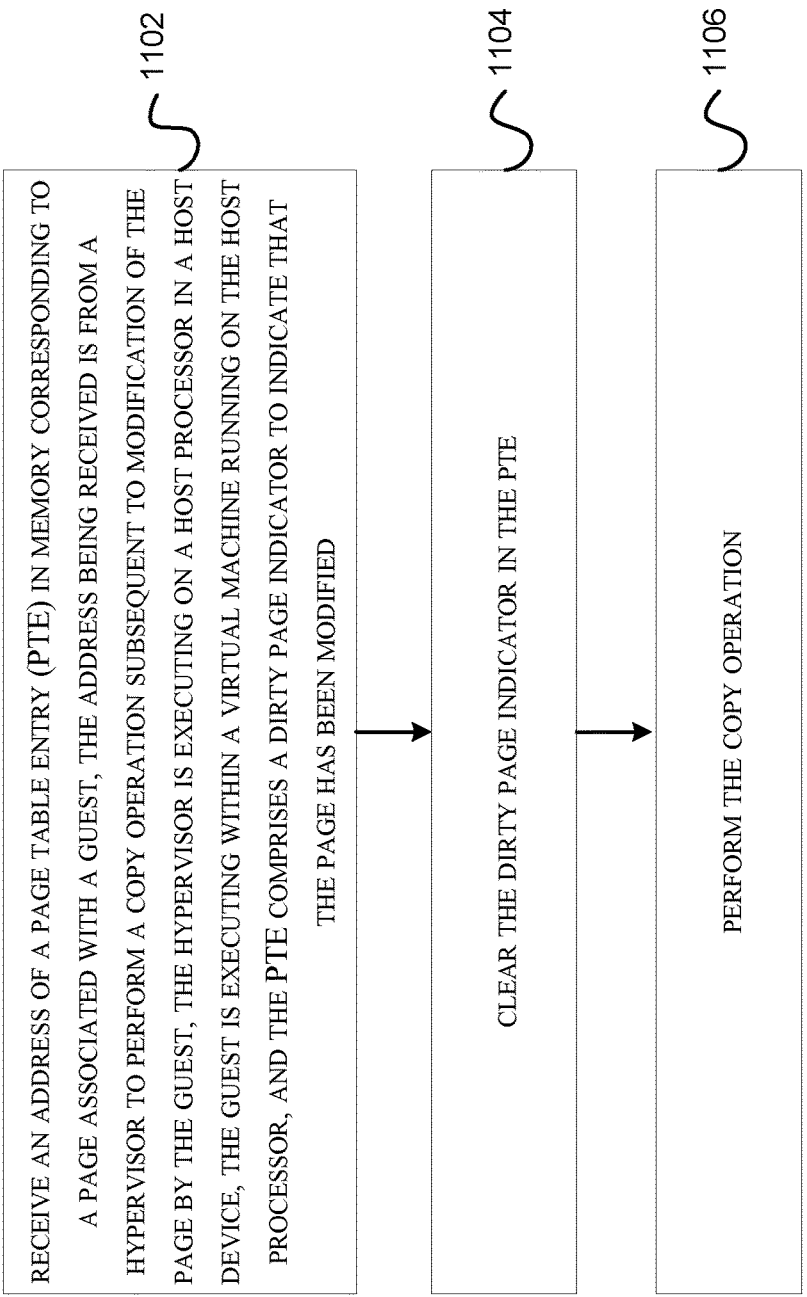
FIG. 11 illustrates a method to provide reduced copy operations for the VM migration, according to the second embodiment.

FIG. 11 illustrates a method 1100 to provide reduced copy operations for the VM migration, according to the second embodiment. The method 1100 may be executed by the processing engine 120, as discussed with reference to FIG. 4.

In a step 1102, a processing engine receives an address of a PTE in memory corresponding to a page associated with a guest. The address being received is from a hypervisor to schedule a copy operation subsequent to modification of the page by the guest. The hypervisor is executing on a host processor in a host device. The guest is executing within a VM running on the host processor. For example, the first guest OS 110a may be executing within the first VM 108a on the host processor 104 in the host device 102. As discussed with reference to step 1002 in FIG. 10, the hypervisor 112 may have scheduled the copy operations of the initial PTEs as part of the pre-copy operation for the migration of the first VM 108a. However, while the initial copy operation is being performed by the processing engine 120, in some instances, the first guest OS 110a may continue to make changes to the pages at the guest PAs 700 asynchronously to the processing engine 120. Thus, the pages which have been modified since the initial copy was performed have to be copied again. The dirty page indicator 602 in the PTE 608 may be used to indicate whether the page has been modified, and the guest PAs of the modified pages may be logged in the PML 114 as the guest PAs 700. The address of the PTE 608 may be the page descriptor address 900 received in the copy queue 512 along with other information associated with the PTE. In one instance, the page may have been modified prior to being scheduled for the copy operation, and later modified again one or more times after being scheduled for the copy operation in the copy queue 512.

In a step 1104, the processing engine may clear the dirty page indicator in the PTE. For example, as discussed in the step 402 of FIG. 4, instead of the hypervisor 112 clearing the dirty page indicator 602, the processing engine 120 can provide delayed clearing by clearing the dirty page indicator 602 in the PTE 608 right before performing the copy operation to allow additional time to capture any additional writes to the page. Thus, the later modifications of the page can be combined into one copy which can avoid redundant copy operations. Referring back to FIG. 5, the dirty page manager 514 may execute an atomic operation to read and clear the dirty page indicator 602 in the PTE 608 in a single step using the page descriptor addresses 900 via the host device interface 506. The TLB manager 518 may invalidate or flush a corresponding entry in the TLB 118 to allow any future writes to the guest PA 700 to trigger setting of the dirty page indicator 602 again in the PTE 608 in the page table 116, as discussed in the step 404 of FIG. 4. The TLB manager 518 may also execute an operation or a barrier to ensure that the invalidation of the TLB entry has been completed across all the multiple processor cores the first VM 108a may be executing on before scheduling the copying of the modified page corresponding to the guest PA 700, as discussed in the step 406 of FIG. 4.

In a step 1106, the processing engine may perform the copy operation. By delaying the clearing of the dirty page indicator 608, the processing engine 120 can combine multiple copy operations to the guest PA 904 into a single copy operation thus reducing the redundant copy operations. The DMA controller 510 may perform the copy operation to copy the memory states associated with the first VM 108a from the memory 122 to a target memory in the target device 126 via the target device interface 508. The DMA controller 510 may perform the copy operation asynchronously to the hypervisor 112 scheduling the copy operations in the copy queue 512 since the hypervisor 112 and the DMA controller 510 may be executing on separate processor cores.

Embodiments of the disclosed technologies can provide systems and methods to reduce the number of redundant copying operations performed to the target host device as part of the live migration of the VMs. A first embodiment can elide redundant copy operations by checking if the page has been modified again before performing the copy operation. A second embodiment can extend the window of time during which additional writes to the modified page can be captured before performing the copy operation. Thus, the system performance can be improved by reducing the redundant operations, which can result in minimizing the usage of the network and memory bandwidth.

Figure 12:
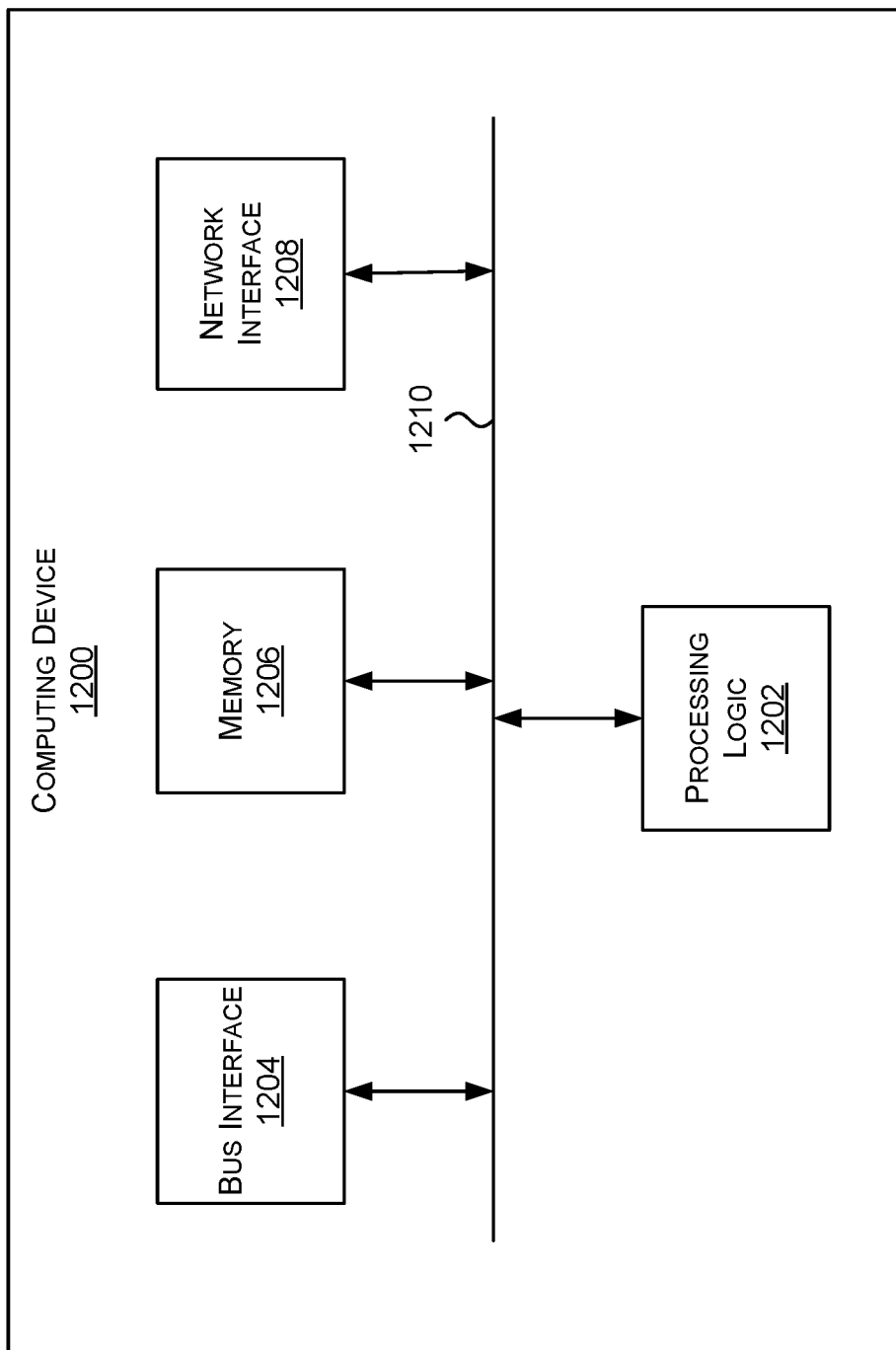
FIG. 12 illustrates an example of a computing device, according to certain aspects of the disclosure.

FIG. 12 illustrates an example of a computing device 1200. Functionality and/or several components of the computing device 1200 may be used without limitation with other embodiments disclosed elsewhere in this disclosure, without limitations. The computing device 1200 may perform computations to facilitate processing of a task. As an illustrative example, the computing device 1200 can be part of a server in a multi-tenant compute service system, e.g., the system 100.

In one example, the computing device 1200 may include processing logic 1202, a bus interface 1204, memory 1206, and a network interface 1208. These components may be hardware modules, software modules, or a combination of hardware and software. In certain instances, components may be interchangeably used with modules or engines, without deviating from the scope of the disclosure. The computing device 1200 may include additional components, not illustrated here. In some implementations, the computing device 1200 may include fewer components. In some implementations, one or more of the components may be combined into one module. One or more of the components may be in communication with each other over a communication channel 1210. The communication channel 1210 may include one or more busses, meshes, matrices, fabrics, a combination of these communication channels, or some other suitable communication channel.

The processing logic 1202 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1206. The processing logic 1202 may include functionalities similar to the processing engine 120, as discussed with reference to FIG. 5, to reduce redundant copy operations, according to different embodiments of the disclosed technologies.

The memory 1206 may include either volatile or non-volatile, or both volatile and non-volatile types of memory. The memory 1206 may, for example, include random access memory (RAM), read only memory (ROM), Electrically Erasable Programmable Read-Only Memory (EEPROM), flash memory, and/or some other suitable storage media. In some cases, some or all of the memory 1206 may be internal to the computing device 1200, while in other cases some or all of the memory may be external to the computing device 1200. The memory 1206 may store an operating system comprising executable instructions that, when executed by the processing logic 1202, provides the execution environment for executing instructions providing functionality for the computing device 1200. The memory 1206 may also store modules stored in the memory 504 or other components of the processing engine 120. In a case where processing logic 1202 is in the form of FPGA, memory 1206 may store netlists data representing various logic circuit components of processing logic 1202.

The bus interface 1204 may enable communication with external entities, such as a host device and/or other components in a computing system over an external communication medium. The bus interface 1204 may include a physical interface for connecting to a cable, socket, port, or other connection to the external communication medium. The bus interface 1204 may further include hardware and/or software to manage incoming and outgoing transactions. The bus interface 1204 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface 1204 may include the physical layer for any of these bus protocols, including a connector, power management, and error handling, among other things. In some implementations, the computing device 1200 may include multiple bus interface modules for communicating with multiple external entities. These multiple bus interface modules may implement the same local bus protocol, different local bus protocols, or a combination of the same and different bus protocols.

The network interface 1208 may include hardware and/or software for communicating with a network. This network interface 1208 may, for example, include physical connectors or physical ports for wired connection to a network, and/or antennas for wireless communication to a network. The network interface 1208 may further include hardware and/or software configured to implement a network protocol stack. The network interface 1208 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1200 may include multiple network interface modules, each configured to communicate with a different network. For example, in these implementations, the computing device 1200 may include a network interface module for communicating with a wired Ethernet network, a wireless 802.11 network, a cellular network, an Infiniband network, etc. In some embodiments, computing device 1200 may receive a set of parameters, such as the aforementioned weight vectors for generation of forget gate factor, input factor, output factor, etc. from a server through network interface 1208.

The various components and modules of the computing device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

Figure 13:
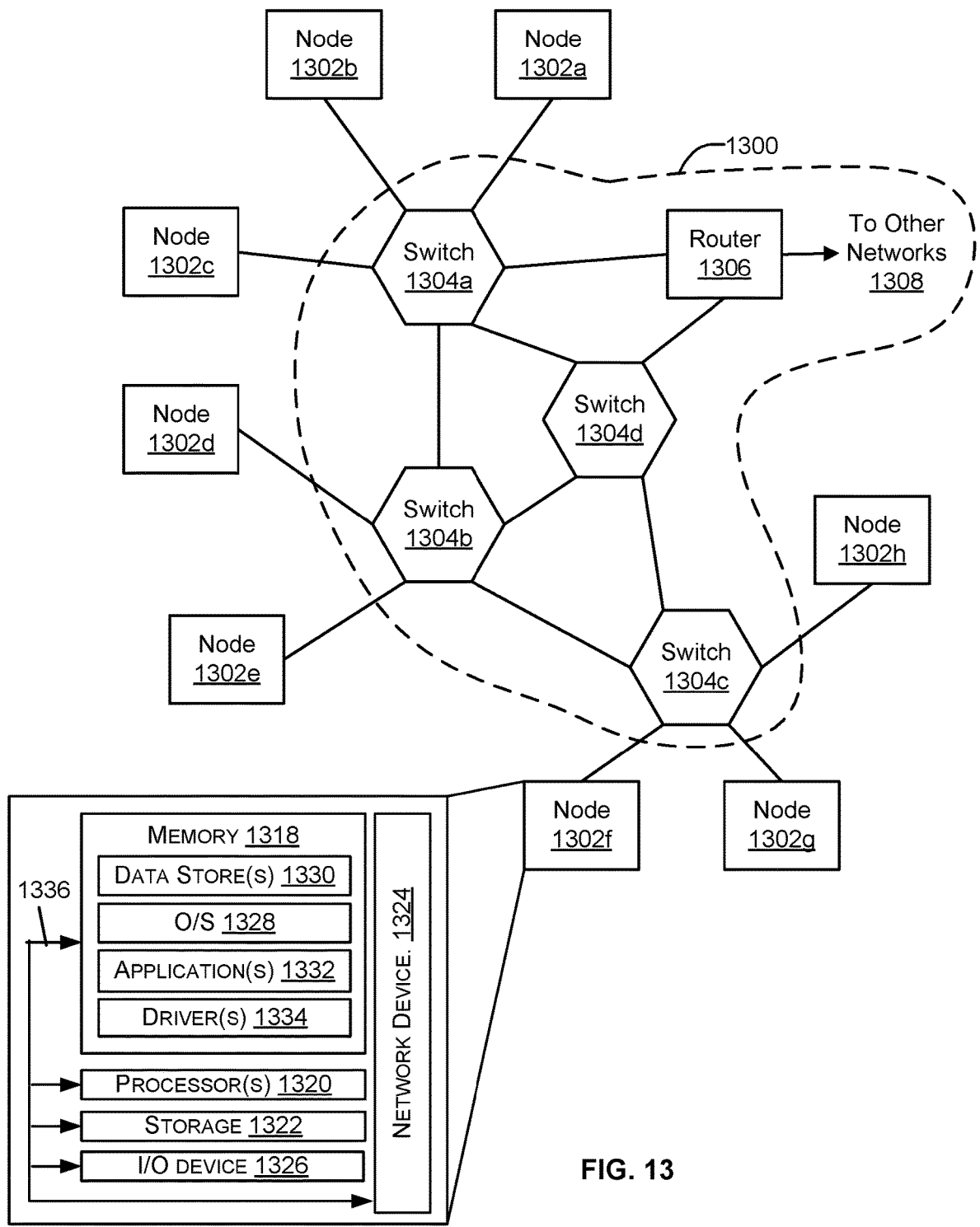
FIG. 13 illustrates an example architecture for features and systems described herein that includes one or more service provider computers and/or a user device connected via one or more networks, according to certain aspects of the disclosure.

FIG. 13 illustrates a network 1300, illustrating various different types of devices such as the computing device 1200 of FIG. 12. In certain embodiments, the network 1300 may be based on a switched architecture with point-to-point links. As illustrated in FIG. 13, the network 1300 includes a plurality of switches 1304*a*-1304*d*, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1304a-1304d may be connected to a plurality of nodes 1302a-1302h and provide multiple paths between any two nodes.

The network 1300 may also include one or more network devices for connection with other networks 1308, such as other subnets, LANs, wide area networks (WANs), or the Internet, and may be referred to as routers 1306. Routers use headers and forwarding tables to determine the best path for forwarding the packets, and use protocols such as internet control message protocol (ICMP) to communicate with each other and configure the best route between any two devices.

In some examples, network(s) 1300 may include any one or a combination of many different types of networks, such as cable networks, the Internet, wireless networks, cellular networks and other private and/or public networks. Interconnected switches 1304a-1304d and router 1306, if present, may be referred to as a switch fabric, a fabric, a network fabric, or simply a network. In the context of a computer network, terms "fabric" and "network" may be used interchangeably herein.

Nodes 1302a-1302h may be any combination of host systems, processor nodes, storage subsystems, and I/O chassis that represent user devices, service provider computers or third party computers. One or more nodes 1302a-1302h may include functionalities of the host device 102 and the processing engine 120.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device(s) may be part of the distributed system managed by, controlled by, or otherwise part of the service provider computer(s) (e.g., a console device integrated with the service provider computers).

The node(s) of FIG. 13 may also represent one or more service provider computers.

One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices 1304. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302*a*-1302*h* or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302*a*-1302*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302*a*-1302*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302*a*-1302*h* may also include I/O device(s) 1326, such as a keyboard, a mouse, a pen, a voice input device, a touch input device, a display, speakers, a printer, and the like. The node(s) 1302*a*-1302*h* may also include one or more communication channels 1336. A communication channel 1336 may provide a medium over which the various components of the node(s) 1302*a*-1302*h* can communicate.

The communication channel or channels 1336 may take the form of a bus, a ring, a switching fabric, or a network.

The node(s) 1302*a*-1302*h* may also contain network device(s) 1324 that allow the node(s) 1302*a*-1302*h* to communicate with a stored database, another computing device or server, user terminals and/or other devices on the network(s) 1300.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1204 may implement NVMe, and the network device 1324 may be connected to a computing system using a PCIe interface. In some implementations, the network device 1324 may include single-root I/O virtualization (SR-IOV).

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

In the foregoing description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
   a host processor configured to execute a hypervisor, wherein the hypervisor is configured to:
      provide information, associated with a page table entry (PTE) corresponding to a page of memory, to schedule a copy operation of the page for a live migration of a virtual machine (VM) running on the host processor, wherein the page is associated with a guest operating system (OS) executing within the VM, and wherein the PTE comprises a dirty page indicator to indicate that the page has been modified; and
   a processing engine separate from the hypervisor executing on the host processor, the processing engine configured to:
      receive the information associated with the PTE corresponding to the page, the information including an address of the PTE associated with the guest OS;
      read the dirty page indicator in the PTE using the address to determine that the page has been modified;
      schedule the page for the copy operation;
      determine that the page has later been modified again;
      execute an atomic operation to clear the dirty page indicator in the PTE after the later modification and before performing the copy operation; and
      perform the copy operation.

2. The system of claim 1, wherein the address of the PTE includes a page descriptor address, and wherein the information associated with the PTE further includes a physical address associated with the guest, a virtual machine identifier (VIVID)) for the VM, and a page size.

3. The system of claim 2, wherein the hypervisor is further configured to: invalidate an entry in a translation lookaside buffer (TLB) corresponding to the page using the VMID and the physical address associated with the guest prior to performing the copy operation.

4. The system of claim 1, wherein the processing engine is part of an input/output (I/O) adapter device coupled to the host processor via a host interface.

5. A method, comprising:
   receiving, by a processing engine separate from a hypervisor executing on a host processor, an address of a page table entry (PTE) in memory corresponding to a page associated with a guest, the address being received from the hypervisor to perform a copy operation subsequent to modification of the page by the guest, the hypervisor executing on the host processor in a host device, wherein the guest is executing within a virtual machine (VM) running on the host processor, the PTE comprising a dirty page indicator to indicate that the page has been modified;
   determining that the page has been modified;
   scheduling the page for the copy operation;
   determining that the page has later been modified again;
   executing, by the processing engine, an atomic operation to clear the dirty page indicator in the PTE after the later modification and before performing the copy operation; and
   performing, by the processing engine, the copy operation.

6. The method of claim 5 further comprising:
   prior to performing the copy operation, invalidating a corresponding entry in a translation lookaside buffer (TLB) in the host processor using a virtual machine identifier (VMID) associated with the VM for a guest physical address corresponding to the page.

7. The method of claim 5, wherein executing the atomic operation to clear the dirty page indicator comprises performing a read-modify-write of the dirty page indicator in the PTE in a single step.

8. The method of claim 5, wherein a guest physical address for the modified page is logged in an entry in a page modification log (PML) subsequent to modification of the page by the guest.

9. The method of claim 5, wherein the copy operation is performed as part of a live migration of the VM from the host device to a target device.

10. The method of claim 5, wherein the copy operation comprises copying memory states associated with the VM from the host device to a target device.

11. The method of claim 10, wherein the processing engine includes a direct memory access (DMA) controller configured to perform the copy operation to the target device.

12. The method of claim 11, wherein the DMA controller is configured to perform the copy operation asynchronous to scheduling of the copy operation by the hypervisor.

13. The method of claim 5, wherein the dirty page indicator in the PTE was asserted by the host processor to indicate that the page has been modified.

14. The method of claim 5, wherein the address of the PTE is a page descriptor address.

15. The method of claim 5, wherein the processing engine includes a processor configured to execute instructions, and the processor does not execute the hypervisor.

16. An apparatus comprising:
    a memory configured to store information associated with a copy operation to be performed for a page, wherein the information is received from a hypervisor executing on a host processor, and wherein the page is associated with a guest executing within a virtual machine (VM) executing on the host processor;
    a processor separate from the hypervisor executing on the host processor, the processor configured to:
        determine that the page has been modified;
        schedule the page for the copy operation;
        determine that the page has later been modified again; and
        clear a dirty page indicator in a page table entry (PTE) corresponding to the page using the information after the later modification and prior to performing the copy operation; and
    a direct memory access (DMA) controller configured to perform the copy operation.

17. The apparatus of claim 16, wherein the information includes a guest physical address, a page descriptor address, a virtual machine identifier (VMID) for the VM, and a page size.

18. The apparatus of claim 17, further comprising:
    a translation lookaside buffer (TLB) manager configured to invalidate an entry in the TLB corresponding to the PTE using the VMID and the guest physical address.

19. The apparatus of claim 17, wherein clearing the dirty page indicator in the PTE is performed by reading the PTE and clearing the dirty page indicator in the PTE using an atomic operation.

20. The apparatus of claim 17, wherein the processor and the host processor are on a same die.

* * * * *